United States Patent
Venkatachalam et al.

(10) Patent No.: US 9,659,213 B2
(45) Date of Patent: May 23, 2017

(54) SYSTEM AND METHOD FOR EFFICIENT RECOGNITION OF HANDWRITTEN CHARACTERS IN DOCUMENTS

(71) Applicant: Cognizant Technology Solutions India Pvt. Ltd., Chennai (IN)

(72) Inventors: Natarajan Venkatachalam, Erode (IN); Swaminathan Mithra Baala Mithra, Tirunelveli (IN); Geelapaturu Subrahmanya Venkata Radha Krishna Rao, Chennai (IN); Anshuman Santosh Gauriar, Nagpur (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 14/885,303

(22) Filed: Oct. 16, 2015

(65) Prior Publication Data
US 2017/0004359 A1 Jan. 5, 2017

(30) Foreign Application Priority Data
Jul. 3, 2015 (IN) .......................... 3421/CHE/2015

(51) Int. Cl.
*G06K 9/34* (2006.01)
*G06K 9/00* (2006.01)
(Continued)

(52) U.S. Cl.
CPC ....... *G06K 9/00422* (2013.01); *G06F 17/273* (2013.01); *G06F 17/2705* (2013.01);
(Continued)

(58) Field of Classification Search
CPC ........... G06K 2209/01; G06K 9/00154; G06K 9/036; G06K 9/18; G06K 9/344;
(Continued)

(56) References Cited

U.S. PATENT DOCUMENTS 5,416,849 A * 5/1995 Huang ................. G06K 9/2054
358/403
5,754,671 A 5/1998 Higgins
(Continued)

OTHER PUBLICATIONS

A. Belaid, Natural Language Processing: Arabic Cursive Handwriting Recognition, URL: (http://www.loria.fr/~abelaid/publis/belaid-acit-17-12-08.pdf) 2008.
(Continued)

*Primary Examiner* — Kanjibhai Patel
(74) *Attorney, Agent, or Firm* — Cantor Colburn LLP (57) ABSTRACT

A system and computer-implemented method for efficient recognition of one or more handwritten characters in one or more documents is provided. The system comprises an image input module configured to receive the one or more documents as one or more images. The system further comprises a snippet extraction module to extract one or more fields of information from the one or more received images. Furthermore, the system comprises a segmentation module to segment the one or more extracted fields of information into one or more segments. Also, the system comprises a feature extraction module configured to extract one or more handwritten characters from each of the one or more segments. In addition, the system comprises a character recognition module configured to recognize the one or more extracted handwritten characters. The system further comprises a language processing module configured to detect and correct errors in the one or more recognized characters.

19 Claims, 7 Drawing Sheets

(51) Int. Cl.
*G06F 17/27* (2006.01)
*G06T 7/00* (2017.01)
*G06K 9/46* (2006.01)

(52) U.S. Cl.
CPC ....... *G06K 9/00409* (2013.01); *G06K 9/4642* (2013.01); *G06T 7/0081* (2013.01); *G06K 2009/4666* (2013.01); *G06T 2207/20021* (2013.01); *G06T 2207/30176* (2013.01)

(58) Field of Classification Search
CPC .. G06K 9/46; G06K 9/00422; G06K 9/00409; G06K 9/4642; G06K 2009/4666; G06F 17/273; G06F 17/2705; G06T 7/0081; G06T 2207/20021; G06T 2207/30176
USPC .......................................... 382/173, 179, 186
See application file for complete search history.

(56) References Cited

U.S. PATENT DOCUMENTS

| | | | | |
|---|---|---|---|---|
| 5,841,901 | A * | 11/1998 | Arai | G06K 9/6292 382/187 |
| 6,535,619 | B1 * | 3/2003 | Suwa | G06K 9/344 382/101 |
| 6,633,672 | B1 | 10/2003 | Guzik | |
| 7,369,702 | B2 | 5/2008 | Abdulkader | |
| 7,689,025 | B2 * | 3/2010 | Takiguchi | G06K 9/32 382/139 |
| 8,005,294 | B2 | 8/2011 | Kundu | |
| 8,315,462 | B2 * | 11/2012 | Nakamura | G06K 9/3233 382/177 |
| 8,559,723 | B2 | 10/2013 | Miljanic | |
| 9,224,065 | B2 * | 12/2015 | Fujieda | G06K 9/342 |
| 9,251,412 | B2 * | 2/2016 | Keysers | G06K 9/00416 |

OTHER PUBLICATIONS

A.W.Senior, "An Off-line Cursive Script Recognition System Using Recurrent Error Propagation Networks", (http://www.andrewsenior.com/papers/Senior93IWFHR.pdf) 2012.

Amit Choudhary, "A Review of Various Character Segmentation Techniques for Cursive Handwritten Words Recognition", (http://www.ripublication.com/irph/ijict_spl/ijictv4n6spl_02.pdf), International Research Publications House, vol. 4, No. 6, 2014.

Mustafa Ali Abuzaraida, "Recognition Techniques for Online Arabic Handwriting Recognition Systems", (http://irep.iium.edu.my/30803/1/06516409.pdf), 2012 International Conference on Advanced Computer Science Application and Technologies, pp. 518-523.

\* cited by examiner

FIG. 1

Part 1 - D. OWNER/TRUST/COPRPORATION INFORMATION

1. Full Name of Owner/Trust/Corporation(30 character limit) _Jenny Louise Schibe_

2. Owner Phone _(123) 456-7990_  Owner SSN/TIN _555-32-1006_

3. Owner Address (PO Boxes are not permitted _1234 Meadow lark way_

City _Meadows_  State _MD_  ZIP _38221_

FIG. 1A

| S. No | Label | Coordinates |
|---|---|---|
| 1 | Full name of Owner / Trust/Corporation | [459,1421,341,99] |
| 2 | Owner Phone | [1271,1433,301,73] |
| 3 | Owner SSN/TIN | [2061,1437,295,79] |
| 4 | Zip | [489,1527,299,87] |

SYSTEM AND METHOD FOR EFFICIENT RECOGNITION OF HANDWRITTEN CHARACTERS IN DOCUMENTS

CROSS REFERENCE TO RELATED APPLICATION

This application is related to and claims the benefit of Indian Patent Application Number 3421/CHE/2015 filed on Jul. 3, 2015, the contents of which are herein incorporated by reference in their entirety.

FIELD OF THE INVENTION

The present invention relates generally to recognition of characters. More particularly, the present invention provides a system and method for efficiently recognizing handwritten characters in one or more documents.

BACKGROUND OF THE INVENTION

Organizations and enterprises all over the world use handwritten and printed documents, some more so than others. Particularly, organizations belonging to healthcare, banking, and insurance domains have important and confidential information in the form of numerous handwritten and printed documents. Further, information in these documents is required to be recognized and stored for different purposes by various enterprise applications and databases.

Conventionally, various systems and methods exist for digitizing printed and handwritten documents. For example, printed and handwritten documents are manually typed. However, manually typing the handwritten and printed documents is inefficient as productivity varies from person to person and depends on typing speed and errors involved in typing. Further, manual typing of the documents results in unnecessary exposure of confidential information.

To overcome the abovementioned disadvantages, systems and methods exist that automatically recognize characters in printed and handwritten documents. However, the abovementioned systems and methods also suffer from various disadvantages. These systems and methods are either incapable or inefficient in recognizing characters in case of cursive handwriting. Further, these systems and methods are unable to accurately segment text in the documents. Furthermore, the abovementioned systems and methods are unable to identify overlapping characters particularly in case of characters written in cursive handwriting.

In light of the abovementioned disadvantages, there is a need for a system and method for efficiently and accurately recognizing handwritten characters in one or more documents. Further, there is a need for a system and method that facilitates error correction using Natural Language Processing (NLP). Furthermore, there is a need for a context specific character recognition system and method. Also, there is a need for a system and method that facilitates real-time recognition of handwritten characters from the one or more documents belonging to different domains.

SUMMARY OF THE INVENTION

A system and computer-implemented method for efficient recognition of one or more handwritten characters in one or more documents is provided. The system comprises an image input module configured to receive the one or more documents as one or more images. The system further comprises a snippet extraction module configured to extract one or more fields of information from the one or more received images. Furthermore, the system comprises a segmentation module configured to segment the one or more extracted fields of information into one or more segments. Also, the system comprises a feature extraction module configured to extract one or more handwritten characters from each of the one or more segments. In addition, the system comprises a character recognition module configured to recognize the one or more extracted handwritten characters. The system further comprises a language processing module configured to detect and correct one or more errors in the one or more recognized characters, wherein detecting and correcting the one or more errors comprises analyzing content in the vicinity of each of the one or more recognized characters. Further, detecting and correcting the one or more errors comprises predicting one or more characters for each of the one or more recognized characters in the extracted fields of information based on the analyzed content. Furthermore, detecting and correcting the one or more errors comprises comparing each of the one or more recognized characters with the one or more predicted characters to detect the one or more errors in the one or more recognized characters. Also, detecting and correcting the one or more errors comprises implementing one or more pre-stored error correction rules and pre-stored error correction algorithms corresponding to the one or more detected errors.

In an embodiment of the present invention, the one or more fields of information are areas within the one or more processed images containing the one or more handwritten characters. In an embodiment of the present invention, the one or more handwritten characters are in the form of: cursive handwritten characters and isolated handwritten characters. In an embodiment of the present invention, the one or more handwritten characters comprise: alphabets, numerals and special characters.

In an embodiment of the present invention, extracting the one or more characters comprises: dividing each of the one or more segments into one or more cells of pre-determined dimensions, computing a Histogram of Oriented Gradients (HOG) for each of the one or more cells and normalizing the HOG for each of the one or more cells and using Principal Component Analysis (PCA) to extract the one or more characters. In an embodiment of the present invention, the content in the vicinity of the one or more recognized characters comprise at least one of: one or more labels and other recognized characters.

In an embodiment of the present invention, predicting the one or more characters for each of the one or more recognized characters comprises using pre-stored information corresponding to the analyzed content. In an embodiment of the present invention, the information corresponding to the analyzed content is pre-stored for each of the one or more documents and further wherein the pre-stored information comprises layout, one or more labels, coordinates of the one or more fields of information corresponding to each of the one or more labels, relationship between two or more fields of information and permissible data format and data type for each of the one or more fields of information of the one or more documents.

In an embodiment of the present invention, the one or more detected errors comprise number substitution errors, alphabet case errors, incorrect data type errors and format errors. In an embodiment of the present invention, the one or more error correction algorithms comprise one or more look-up tables containing mapping of misrecognized characters and combinations of misrecognized characters with corresponding correct characters and combinations of correct characters.

The computer-implemented method for efficient recognition of one or more handwritten characters in one or more documents, via program instructions stored in a memory and executed by a processor, comprises receiving the one or more documents as one or more images. The computer-implemented method further comprises extracting one or more fields of information from the one or more received images. Furthermore, the computer-implemented method comprises segmenting the one or more extracted fields of information into one or more segments. Also, the computer-implemented method comprises extracting one or more handwritten characters from each of the one or more segments. In addition, the computer-implemented method comprises recognizing the one or more extracted handwritten characters. The computer-implemented method further comprises detecting and correcting one or more errors in the one or more recognized characters, wherein the step of detecting and correcting the one or more errors comprises analyzing content in the vicinity of each of the one or more recognized characters. The step of detecting and correcting the one or more errors further comprises predicting one or more characters for each of the one or more recognized characters in the extracted fields of information based on the analyzed content. Furthermore, the step of detecting and correcting the one or more errors comprises comparing each of the one or more recognized characters with the one or more predicted characters to detect the one or more errors in the one or more recognized characters and implementing at least one of: one or more pre-stored error correction rules and one or more pre-stored error correction algorithms corresponding to the one or more detected errors.

A computer program product for efficient recognition of one or more handwritten characters in one or more documents is provided. The computer program product comprises a non-transitory computer-readable medium having computer-readable program code stored thereon, the computer-readable program code comprising instructions that when executed by a processor, cause the processor to receive the one or more documents as one or more images. The processor further extracts one or more fields of information from the one or more received images. Furthermore, the processor segments the one or more extracted fields of information into one or more segments. Also, the processor extracts one or more handwritten characters from each of the one or more segments. In addition the processor recognizes the one or more extracted handwritten characters. The processor further detects and corrects one or more errors in the one or more recognized characters, wherein the step of detecting and correcting the one or more errors comprises analyzing content in the vicinity of each of the one or more recognized characters. The step of detecting and correcting the one or more errors further comprises predicting one or more characters for each of the one or more recognized characters in the extracted fields of information based on the analyzed content. Furthermore, the step of detecting and correcting the one or more errors comprises comparing each of the one or more recognized characters with the one or more predicted characters to detect the one or more errors in the one or more recognized characters. The step of detecting and correcting the one or more errors also comprises implementing at least one of: one or more pre-stored error correction rules and one or more pre-stored error correction algorithms corresponding to the one or more detected errors.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for efficiently and accurately recognizing handwritten characters in one or more documents is described herein. The invention provides for a system and method that facilitates error correction using Natural Language Processing (NLP). Further, the invention provides for a segment based and context based handwritten character recognition system and method. Furthermore, the invention provides for a system and method that facilitates real-time recognition of handwritten characters from the one or more documents belonging to different domains.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
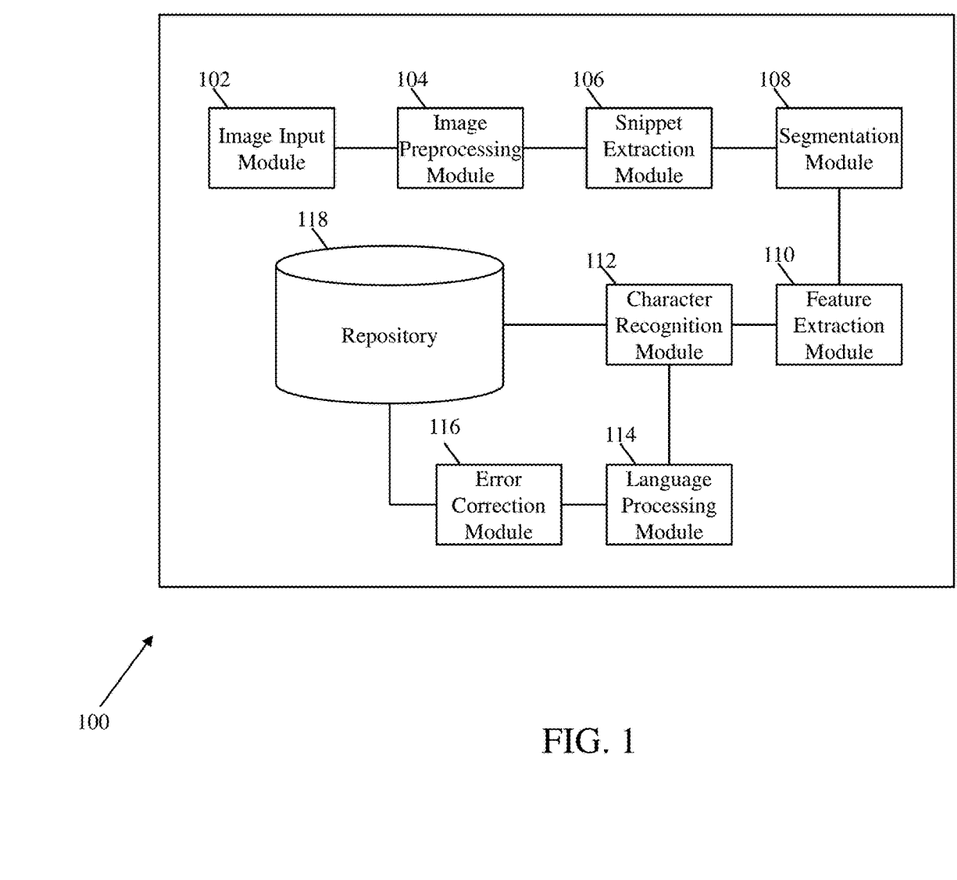
FIG. 1 is a block diagram illustrating a system for efficiently recognizing handwritten characters in documents, in accordance with an embodiment of the present invention.

FIG. 1 is a block diagram illustrating a system for efficient recognition of handwritten characters in one or more documents, in accordance with an embodiment of the present invention. The system 100 comprises an image input module 102, an image preprocessing module 104, a snippet extraction module 106, a segmentation module 108, a feature extraction module 110, a character recognition module 112, a language processing module 114, an error correction module 116 and a repository 118. In an embodiment of the present invention, the system 100 uses MATLAB for image processing and character recognition.

The image input module 102 is configured to receive one or more documents. In an embodiment of the present invention, the one or more documents are in the form of one or more images. The one or more images may have various file formats including, but not limited to, a Joint Photographic Experts Group (JPEG) format, a JPEG File Interchange Format (JFIF), an Exchangeable Image File Format (EXIF), a Tagged Image File Format (TIFF), a Graphics Interchange Format (GIF), a bitmap image file format, a Portable Network Graphics (PNG) format and any other image file format.

In an embodiment of the present invention, the image input module 102 is a front-end user interface configured to facilitate one or more users to access the system 100. The user interface is further configured to facilitate the one or more users to submit one or more documents for character recognition. Furthermore, the one or more users identify and classify the one or more submitted documents based on business domain and business type. In an embodiment of the present invention, the one or more submitted documents belong to a business domain such as, but not limited to, insurance, financial services, banking and healthcare. In an embodiment of the present invention, business type refers to the type of the one or more submitted documents corresponding to a particular business domain. In an exemplary embodiment of the present invention, different types of documents associated with insurance domain include, but not limited to, Association for Cooperative Operations Research and Development (ACORD) forms, cisgem forms, schedules, lossrun reports, Market Value Reduction (MVR) reports and addendums to insurance policy. The one or more users can also check and monitor status and quality of the one or more submitted documents via the user interface. The one or more documents include, but not limited to, insurance forms filled by customer, cheques, delivery notes and medical notes. In various embodiments of the present invention, the user interface is an interactive interface such as, but not limited to, a Graphical User Interface (GUI), a character user interface and a touch screen interface.

In an embodiment of the present invention, the one or more users access the system 100, to submit the one or more documents, via an electronic communication device including, but not limited to, a desktop, a notebook, a laptop, a mobile phone, a smart phone and a Personal Digital Assistant (PDA). In another embodiment of the present invention, the image input module 102 receives the one or more documents via one or more submission channels. The one or more submission channels include, but not limited to, facsimile, email, instant message and image scanner. In an embodiment of the present invention, the image input module 102 facilitates the one or more users to configure their email or fax accounts with the system 100. Further, configuring email or fax accounts with the system 100 facilitates submitting the one or more documents received on email or fax accounts of the one or more users directly on the system 100 without user-intervention. The one or more documents submitted via the image input module 102 are stored in the repository 118 for character recognition.

The image preprocessing module 104 is configured to process the one or more received images. The image preprocessing module 104 processes the one or more received images using various techniques such as, but not limited to, binarization, noise filtering, thinning, slant correction and operations to separate background. The image preprocessing module 104 is discussed in detail in conjunction with FIG. 2.

Figure 2:
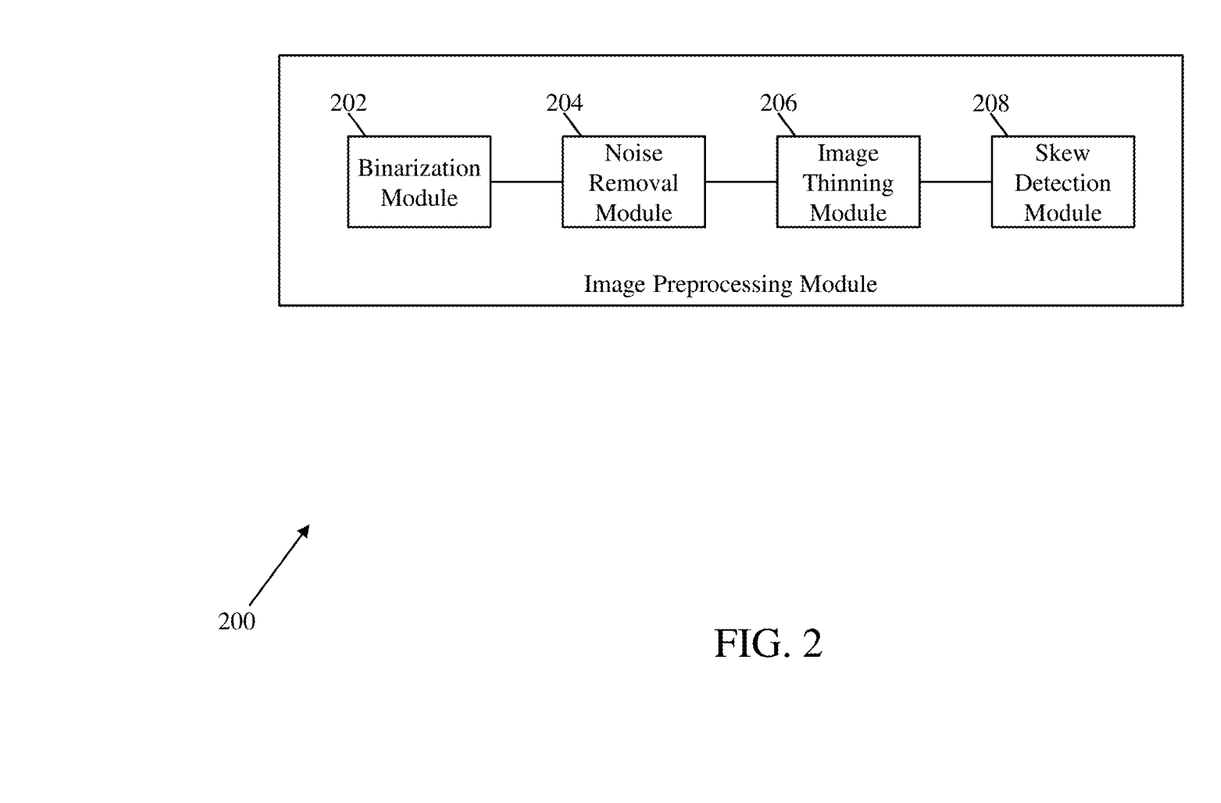
FIG. 2 is a detailed block diagram illustrating an image preprocessing module, in accordance with an embodiment of the present invention.

FIG. 2 is a detailed block diagram of the image preprocessing module, in accordance with an embodiment of the present invention. The image preprocessing module 200 comprises a binarization module 202, a noise removal module 204, an image thinning module 206 and a skew detection module 208.

The binarization module 202 is configured to binarize the one or more received images using automatic thresholding technique. The binarization module 202 performs a two-level thresholding operation using histogram of the one or more received images. In an embodiment of the present invention, the first level thresholding is performed using Otsu method and then applying connected component algorithm. The next level thresholding is performed on each location of connected components in original gray level image.

The noise removal module 204 is configured to remove isolated pixels among connected components forming the one or more characters in the one or more binarized images. In an embodiment of the present invention, the noise removal module 204 removes isolated dots/speckles and line patterns that are not required. The noise removal module 204 does not remove any character dots. In an embodiment of the present invention, dots/speckles are removed using Low Pass Filtering. In an embodiment of the present invention, line patterns are detected and removed using Horizontal Projection Profile (HPP). Further, the removed pixels are rectified by checking the neighboring pixels that could be inserted into the removed dots and lines. Furthermore, the insertion is based on neighboring pixels satisfying one or more conditions. In an embodiment of the present, Connected Component Analysis (CCA) is applied to obtain the number of connected pixels present in a component and aspect ratio for each component. The minimum and maximum values associated with the component are then computed. In an exemplary embodiment of the present invention, values of $\alpha$ and $\beta$ are calculated for each component and computed using the following mathematical formula $$\alpha = (np - \min p)/(\max p - \min p)$$

$$\beta = (na - \min a)/(\max a - \min a)$$

where np is number of pixels in the component, na is aspect ratio of the component and $\alpha$ and $\beta$ are variables associated with the one or more conditions. In an embodiment of the present invention, if $\alpha$ or $\beta$ is less than 0.002 then the corresponding pixel is removed.

The image thinning module 206 is configured to perform skelotonization/thinning of the one or more images received from the noise removal module 204. Further, skelotonization/thinning is performed to reduce the width of foreground regions in the one or more images. In an embodiment of the present invention, the width of a line like object is reduced from multiple pixels to a single pixel by the image thinning module 206. Further, image thinning facilitates in simplifying character recognition as recognition algorithm operates on characters which are only one pixel wide. Furthermore, image thinning facilitates in reducing processing time and memory resources required to store pixel information.

The skew detection module 208 is configured to detect and remove skew in the one or more images received from the thinning module 206. In an embodiment of the present invention, the skew detection module 208 employs Hough transform for skew angle estimation. The skew correction is then performed based on the estimated skew angle.

Referring back to FIG. 1, the snippet extraction module 106 is configured to receive the one or more processed images from the image preprocessing module 104 and further configured to extract one or more fields/snippets of information from the one or more processed images. The one or more fields of information are areas within the one or more processed images containing text to be extracted. The one or more fields of information contain the text in the form of, but not limited to, cursive handwritten characters, isolated handwritten characters and printed characters. In an embodiment of the present invention, one or more characters include, but not limited to, alphabets, numerals and special characters.

In an embodiment of the present invention, coordinates of the one or more fields of information for each of the one or more documents are pre-stored in the repository 118. In an embodiment of the present invention, the coordinates of the one or more fields of information are pre-stored, at the time of configuring the system 100, using one or more sample images of the one or more documents. The one or more sample images contain labels and corresponding one or more fields where the information is provided. Further, the coordinates of the one or more fields corresponding to each label are stored. During operation, the snippet extraction module 106 extracts the one or more fields of information from the one or more processed images using the stored coordinates. The one or more fields of information are extracted using the stored coordinates corresponding to the business type of each of the one or more submitted documents.

Figure 1A:
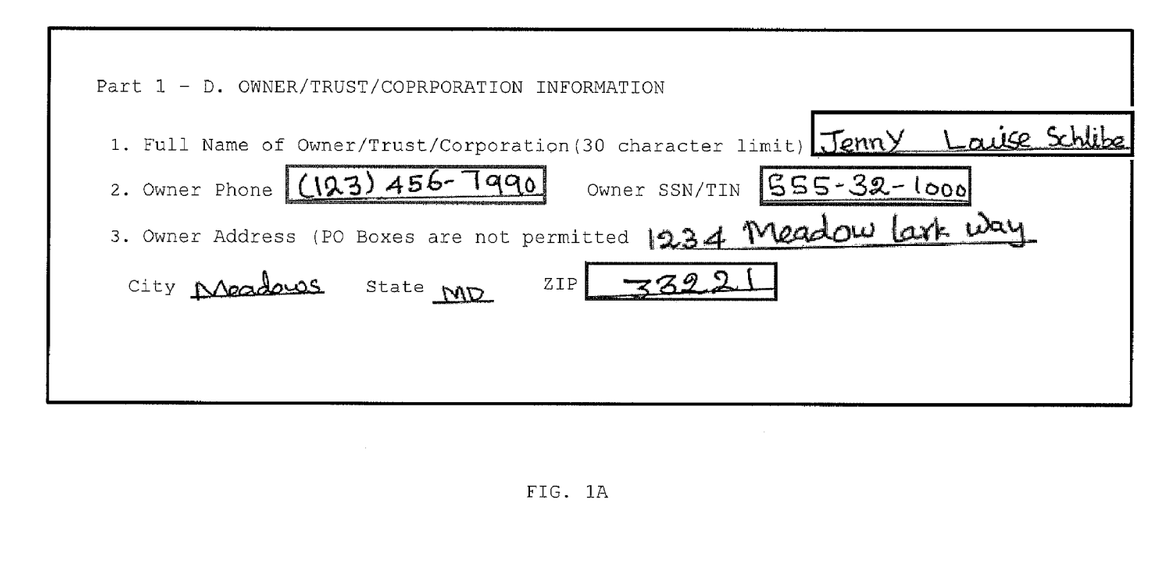
FIG. 1A is a sample image illustrating one or more labels and corresponding one or more fields of information, in accordance with an exemplary embodiment of the present invention.
Figure 1B:
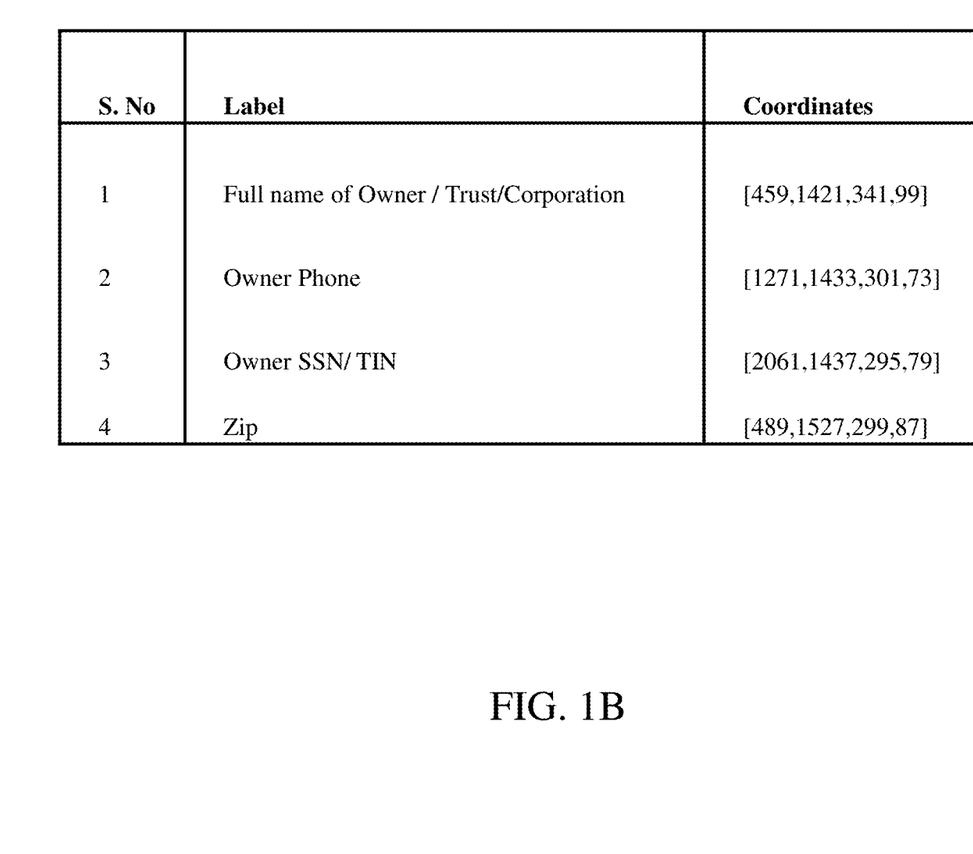
FIG. 1B is a table illustrating the one or more labels and coordinates of corresponding one or more fields of information of a sample image, in accordance with an exemplary embodiment of the present invention.

FIG. 1A is a sample image illustrating the one or more labels and corresponding one or more fields of information, in accordance with an exemplary embodiment of the present invention. In an embodiment of the present invention, the sample image contains labels such as, "Full name of Owner/Trust/Corporation", "Owner Phone", "Owner Address", "City", "State" and "ZIP". In an embodiment of the present invention, the rectangular areas containing "Jenny Louise Schliabe" and "(123) 456-7990" are fields of information. FIG. 1B is a table illustrating the one or more labels and coordinates of the corresponding one or more fields of information of the sample image, in accordance with an exemplary embodiment of the present invention.

Once the one or more fields of information are extracted, the snippet extraction module 106 also checks and removes any lines interspersed with the text within the one or more extracted fields.

The segmentation module 108 is configured to segment the one or more extracted fields of information into one or more segments. Further, the segmentation module 108 comprises one or more segmentation algorithms that facilitate segmenting the one or more extracted fields. In an embodiment of the present invention, parameters for segmentation algorithm are selected such that each segment contains a character or part of the character from the text in the extracted field. The average width of each of the one or more segments is estimated using the height of the extracted field of information. Further, exact width of each segment is determined based on number of pixels. In an embodiment of the present invention, a segment must have at least a pre-determined number of pixels. In an embodiment of the present invention, the exact width of the one or more segments is based on the width of one or more words present in each of the one or more fields of information. Further, the segmentation module 108 comprises experimental data associated with width of each of the one or more characters. The experimental data is used to determine the exact width of the one or more segments. In an embodiment of the present invention, if a character in a segment is not recognized during character recognition, then the segmentation module 108 resizes the width of the segment and repeats the character recognition process.

The feature extraction module 110 is configured to extract one or more characters from the one or more segments. In an embodiment of the present invention, the one or more characters are extracted from regions of the one or more segments containing foreground pixels. The feature extraction module 110 divides each of the one or more segments into one or more cells of pre-determined dimensions. In an embodiment of the present invention, the dimension of each of the one or more cells is 9×9 pixels. The feature extraction module 110 then computes a Histogram of Oriented Gradients (HOG) for each of the one or more cells. In an embodiment of the present invention, the HOG is computed using MATLAB. The computed HOG for each of the one or more cells are gradient based image descriptors. In an embodiment of the present invention, the feature extraction module 110 also computes edge orientation histograms for extracting the one or more features from the one or more cells. Further, the feature extraction module 110 normalizes the HOG for each of the one or more cells and uses Principal Component Analysis (PCA) to extract the one or more characters from each of the one or more segments. In an embodiment of the present invention, HOG-PCA facilitates in efficiently extracting significant characteristics irrespective of illumination variation. Further, the PCA based approach helps in reducing feature dimensions. Also, computations involved with HOG-PCA are simple and efficient thereby increasing overall character recognition efficiency.

The character recognition module 112 is a neural network classifier capable of recognizing the extracted one or more characters. In an embodiment of the present invention, a multi-layered perceptron neural network with tan sigmoid activation function is used for classification and recognition of the extracted one or more characters. Further, the neural network is trained using various combinations and styles of segmented characters (hereinafter referred to as patterns). In an embodiment of the present invention, the neural network comprises 72 neurons in output layer that correspond to one of the 72 characters (A-Z, a-z, 0-9 and 10 special characters). In an embodiment of the present invention, the neural network is trained using thousands of different patterns to facilitate accurate recognition of handwritten characters. In an embodiment of the present invention, a fixed size input HOG-PCA feature vector is applied to the character images in a set of labeled train and test datasets. In an embodiment of the present invention, the neural network consists of 96 input and 72 neurons in output layer to identify each of the one or more handwritten characters. Further, each neuron corresponds to a binary value of the normalized character matrix and each output neuron corresponds to one of the 72 characters.

In an embodiment of the present invention, the character recognition module 112 recognizes an extracted character as a single character by comparing the extracted character with the pre-stored patterns. In another embodiment of the present invention, the character recognition module 112 provides a list of all possible characters along with a probability percentage. In an embodiment of the present invention, the character recognition module 112 assigns a low probability of recognition for poor quality images.

The language processing module 114 is configured to identify and correct one or more errors introduced during character recognition. In an embodiment of the present invention, the language processing module 114 comprises pre-stored information related to each of the one or more documents. The pre-stored information related to each of the one or more documents include, but is not limited to, layout, labels, coordinates of the one or more fields of information corresponding to each of the one or more labels, relationship between two or more fields and permissible data format and data type for each field. In an embodiment of the present invention, the pre-stored information is stored at the time of configuring the system 100. In another embodiment of the present invention, the pre-stored information related to the one or more documents is configurable and can be modified for configuring additional documents and modifying information related to existing documents. In an embodiment of the present invention, the language processing module 114 does not remove typographical errors thereby allowing cloning of data without tampering.

The language processing module 114 facilitates customized error correction for each of the one or more fields of information using the pre-stored information. In an embodiment of the present invention, the language processing module 114 is a Natural Language Processing (NLP) based classifier. The language processing module 114 analyzes content in the vicinity of each of the one or more recognized characters using pre-stored information corresponding to the analyzed content. In an embodiment of the present invention, the language processing module 114 analyzes content such as, but not limited to, labels and other recognized characters in the vicinity of each recognized character. The language processing module 114 then predicts one or more characters for each of the one or more recognized characters in the one or more extracted fields of information using at least one of: the analyzed content and the pre-stored information corresponding to the analyzed content. Further, the language processing module 114 detects one or more errors in the recognized characters by comparing each of the one or more recognized characters with the one or more corresponding predicted characters. In an embodiment of the present invention, the one or more detected errors include, but not limited to, number substitution errors, alphabet case errors, incorrect data type errors and format errors.

In an embodiment of the present invention, in case one or more errors are detected, the language processing module 114 implements one or more pre-stored error correction rules and one or more pre-stored error correction algorithms corresponding to the one or more detected errors. The one or more pre-stored error correction algorithms comprise one or more look-up tables containing mapping of commonly misrecognized characters or combinations of characters with correct characters or combinations of characters. For example, the segmentation module 108 may segment the letter 'm' as either I and 'n' or 'n' and 'I' or 'III'. The language processing module 114 uses the one or more look-up tables to correct errors by substituting each of the one or more erroneous character with one or more characters from the one or more look-up tables to form the correct word thereby determining the correct character. In an embodiment of the present invention, once the one or more erroneous characters are correctly determined, the language processing module 114 facilitates in correction of the one or more corrected characters at other places in the document.

In an embodiment of the present invention, the language processing module 114 also facilitates in removing special characters that are erroneously inserted in the one or more documents. In an embodiment of the present invention, special characters such as, but not limited to, commas, hyphen, and apostrophe erroneously inserted or introduced during scanning are removed by implementing the one or more error correction algorithms for ensuring complete words. In another embodiment of the present invention, the language processing module 114 further checks that no special characters are present in the one or more extracted fields of information that do not allow for such data type.

In an embodiment of the present invention, the language processing module 114 also handles mixed case errors such as, but not limited to, presence of capital "C" in the middle of the word "criCket". Further, mixed case errors are handled using look-up tables comprising mapping of commonly misinterpreted letters and the one or more pre-stored rules for error correction. In an embodiment of the present invention, the language processing module 114 also handles number substitution errors. The number substitution errors include errors such as, but not limited to, presence of numbers in fields accepting only alphabets. In an exemplary embodiment of the present invention, the recognized number "0" in the word "An" is replaced with letter "o" by the pre-stored error correction algorithm.

In an embodiment of the present invention, the language processing module 114 also checks and corrects format errors. In an embodiment of the present invention, fields containing date are mapped to date format and validated using the one or more pre-stored rules related to date format such as, but not limited to, number in date cannot exceed 31 and number in months cannot exceed 12.

In an embodiment of the present invention, the language processing module 114 also compares recognized characters present in related fields to detect any errors. In an exemplary embodiment of the present invention, recognized characters corresponding to an amount in numeric form is compared with related fields containing number name for documents such as, but not limited to, cheques. In another exemplary embodiment of the present invention, fields containing information such as place/location, country and zip code are related and are corrected based on the information provided in the other field. The language processing module 114 comprise zip code lookup table having associated location/place and country. The location/place and country fields are thus checked and corrected in case of any errors using the zip code lookup table. Likewise, any errors in the zip code are also corrected. Further, zip code field should contain only numeric values. Any misrecognized non-numeric character in the zip code field is also replaced with a corresponding digit using the zip code look-up table.

Once the one or more errors are corrected by the language processing module 114, the one or more documents are considered to be digitized. The one or more users can also access and edit the one or more digitized documents. The error correction module 116 is configured to facilitate the one or more users to edit the one or more digitized documents via the user interface. In an embodiment of the present invention, the one or more users may edit the one or more digitized documents having low probability of recognition due to poor image quality via the user interface.

The one or more digitized documents and the information in the form of recognized characters stored in the system 100 is used by one or more enterprise applications and databases. In an embodiment of the present invention, the system 100 is integrated with other enterprise systems. In an exemplary embodiment of the present invention, the system 100 is used as an automated cheque processing system. Further, such a system would require pre-stored information for recognizing numbers only thereby ensuring quick character recognition and high processing speed. In another exemplary embodiment of the present invention, the system 100 is used as an automated insurance forms processing system. In yet another exemplary embodiment of the present invention, the system 100 is used as medical forms processing system for automatically digitizing forms used in healthcare industry. In an embodiment of the present invention, the system 100 employs efficient processors capable of processing over 10,000 documents per hour.

Figure 3A:
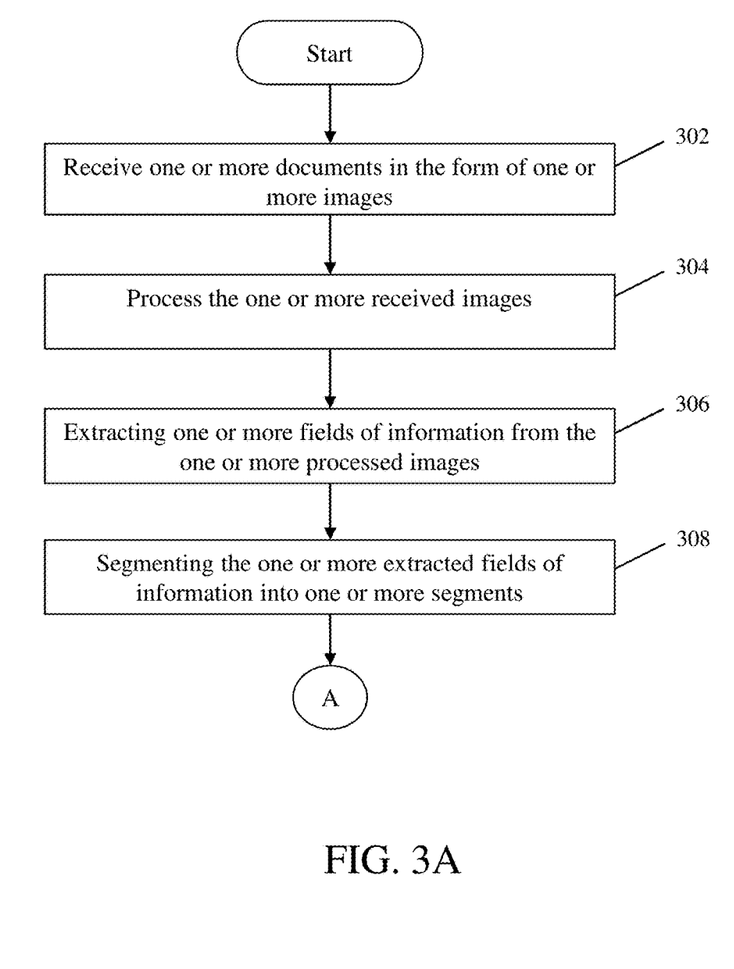
FIGS. 3A and 3B represent a flowchart of a method for efficiently recognizing handwritten characters in documents, in accordance with an embodiment of the present invention.
Figure 3B:
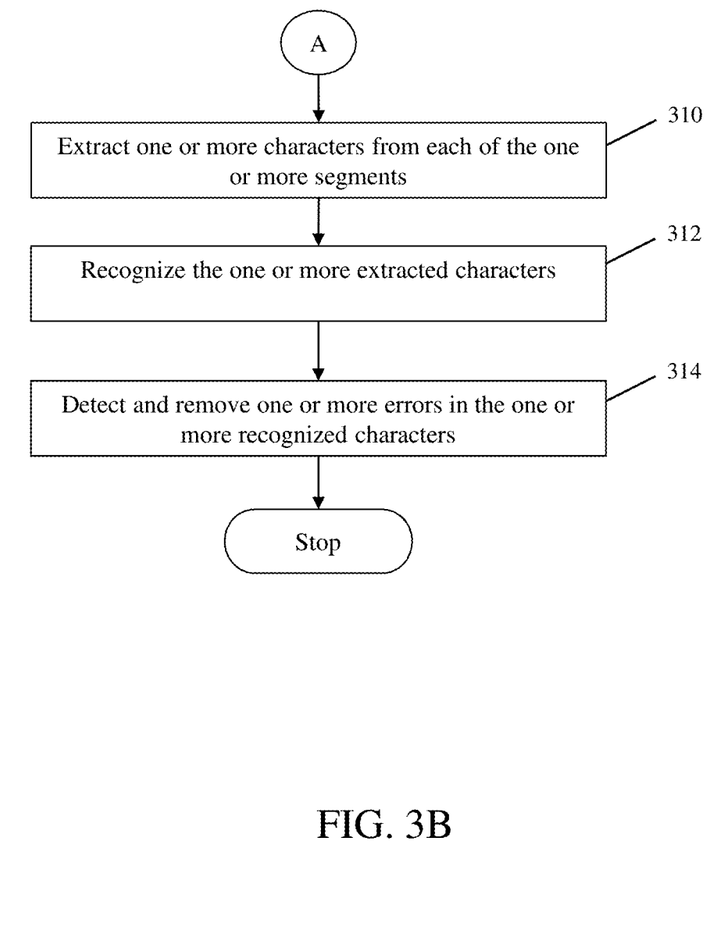

FIGS. 3A and 3B represent a flowchart of a method for efficiently recognizing cursive handwritten characters in documents, in accordance with an embodiment of the present invention.

At step 302, one or more documents are received. In an embodiment of the present invention, the one or more documents are in the form of one or more images. The one or more images may have various file formats such as, but not limited to, a Joint Photographic Experts Group (JPEG) format, a JPEG File Interchange Format (JFIF), an Exchangeable Image File Format (EXIF), a Tagged Image File Format (TIFF), a Graphics Interchange Format (GIF), a bitmap image file format, a Portable Network Graphics (PNG) format and any other image file format. In an embodiment of the present invention, the one or more documents are received via a user interface. The user interface facilitates one or more users to submit one or more documents for character recognition. Further, the one or more users can check and monitor status and quality of the one or more submitted documents via the user interface. In an embodiment of the present invention, the one or more submitted documents comprise documents from various domains including insurance, financial services, banking and healthcare. The one or more documents include, but not limited to, insurance forms filled by customer, cheques, delivery notes and medical notes. In various embodiments of the present invention, the user interface is an interactive interface such as, but not limited to, a Graphical User Interface (GUI), a character user interface and a touch screen interface.

In an embodiment of the present invention, the one or more users submit the one or more documents, via an electronic communication device including, but not limited to, a desktop, a notebook, a laptop, a mobile phone, a smart phone and a Personal Digital Assistant (PDA). In another embodiment of the present invention, the one or more documents are received via one or more submission channels. The one or more submission channels include, but not limited to, facsimile, email, instant message and image scanner. Further, the one or more submitted documents are identified and classified based on business domain and business type. In an embodiment of the present invention, the one or more submitted documents belong to a business domain such as, but not limited to, insurance, financial services, banking and healthcare. In an embodiment of the present invention, business type refers to the type of the one or more submitted documents corresponding to a particular business domain. In an exemplary embodiment of the present invention, various types of documents associated with insurance domain include, but not limited to, Association for Cooperative Operations Research and Development (ACORD) forms, cisgem forms, schedules, lossrun reports, Market Value Reduction (MVR) reports and addendums to insurance policy.

At step 304, the one or more received images are processed. In an embodiment of the present invention, the one or more received images are processed by applying various operations such as, but not limited to, binarization, noise filtering, thinning, slant correction and operations to separate background.

At step 306, one or more fields of information are extracted from the one or more processed images. The one or more fields of information are areas within the one or more processed images containing text to be extracted. The one or more fields of information contain the text in the form of, but not limited to, cursive handwritten characters, isolated handwritten characters and printed characters. In an embodiment of the present invention, one or more characters include, but not limited to, alphabets, numerals and special characters.

In an embodiment of the present invention, coordinates of the one or more fields of information are pre-stored in a repository using one or more sample images of the one or more documents. The one or more sample images contain labels and corresponding one or more fields where the information is provided. Further, the coordinates of the one or more fields corresponding to each label are stored. During operation, the one or more fields of information from the one or more processed images are extracted using the stored coordinates corresponding to the business type of each of the one or more submitted documents.

At step 308, the one or more extracted fields of information are segmented into one or more segments. The one or more segments contain a character from the text within the one or more extracted fields. In an embodiment of the present invention, parameters for segmentation algorithm are selected such that each segment contains a character or part of the character from the text in the extracted field. Further, average width of each of the one or more segments is estimated using the height of the extracted field of information. Furthermore, exact width of each segment is determined based on number of pixels. In an embodiment of the present invention, a segment must have at least a pre-determined number of pixels.

At step 310, one or more characters are extracted from the one or more segments. In an embodiment of the present invention, the one or more characters are extracted from regions of the one or more segments containing foreground pixels. During operation, each of the one or more segments is divided into one or more cells of pre-determined dimensions. In an embodiment of the present invention, the dimension of each of the one or more cells is 9×9 pixels. Further, Histogram of Oriented Gradients (HOG) for each of the one or more cells is computed. In an embodiment of the present invention, the HOG is computed using MATLAB. The computed HOG for each of the one or more cells are gradient based image descriptors. In an embodiment of the present invention, edge orientation histograms are also computed for extracting the one or more character features from the one or more cells. Further, the HOG for each of the one or more cells is normalized and Principal Component Analysis (PCA) is used to extract the one or more characters from each of the one or more segments. In an embodiment of the present invention, HOG-PCA facilitates in efficiently extracting the one or more characters irrespective of illumination variation. Further, computations involved with HOG-PCA are simple and efficient thereby increasing overall character recognition efficiency.

At step 312, the one or more extracted characters are recognized using a neural network classifier. In an embodiment of the present invention, a three layered multi perceptron neural network with tan sigmoid activation function is used for classification and recognition of the extracted one or more characters. Further, the neural network is trained using various combinations and styles of segmented characters (hereinafter referred to as patterns). In an embodiment of the present invention, the neural network is trained using thousands of such patterns. In an exemplary embodiment of the present invention, the neural network comprises 72 neurons in output layer that correspond to one of the 72 characters (A-Z, a-z, 0-9 and 10 special characters).

In an embodiment of the present invention, the extracted character is recognized as a single character with highest probability. In another embodiment of the present invention, a list of possible recognized characters along with a probability percentage is generated by the neural network. In an embodiment of the present invention, a low probability of recognition is assigned to poor quality images.

At step 314, one or more errors in the one or more recognized characters are detected and corrected using pre-stored information related to each of the one or more documents. The pre-stored information related to each of the one or more documents include, but is not limited to, layout, labels, coordinates of the one or more fields of information corresponding to each of the one or more labels, relationship between two or more fields and permissible data format and data type for each field. In an embodiment of the present invention, the information related to the one or more documents is configurable and can be modified for configuring additional documents and modifying information related to existing documents.

In an embodiment of the present invention, the one or more errors are detected by analyzing content in the vicinity of each of the one or more recognized characters. In an embodiment of the present invention, content such as, but not limited to, labels and other recognized characters, in the vicinity of each recognized character, is analyzed using pre-stored information corresponding to the content. Further, one or more characters are predicted for each of the one or more recognized characters based on at least one of: the analyzed content and the corresponding pre-stored information. Furthermore, each of the one or more recognized characters is compared with the one or more predicted characters to detect the one or more errors in the one or more recognized characters. In an embodiment of the present invention, the one or more detected errors include, but not limited to, number substitution errors, alphabet case errors, incorrect data type errors and format errors.

Once the one or more errors are detected, one or more pre-stored error correction rules and pre-stored error correction algorithms corresponding to the one or more detected errors are implemented. In an embodiment of the present invention, the one or more error correction algorithms comprise one or more look-up tables containing mapping of misrecognized characters and combinations of misrecognized characters with corresponding correct characters and combinations of correct characters.

Once the one or more errors are corrected, the one or more documents are considered to be digitized. Further, the one or more users can access and edit the one or more digitized documents via the user interface. Furthermore, the one or more digitized documents and the information in the form of recognized characters can be used by one or more enterprise applications and databases.

Figure 4:
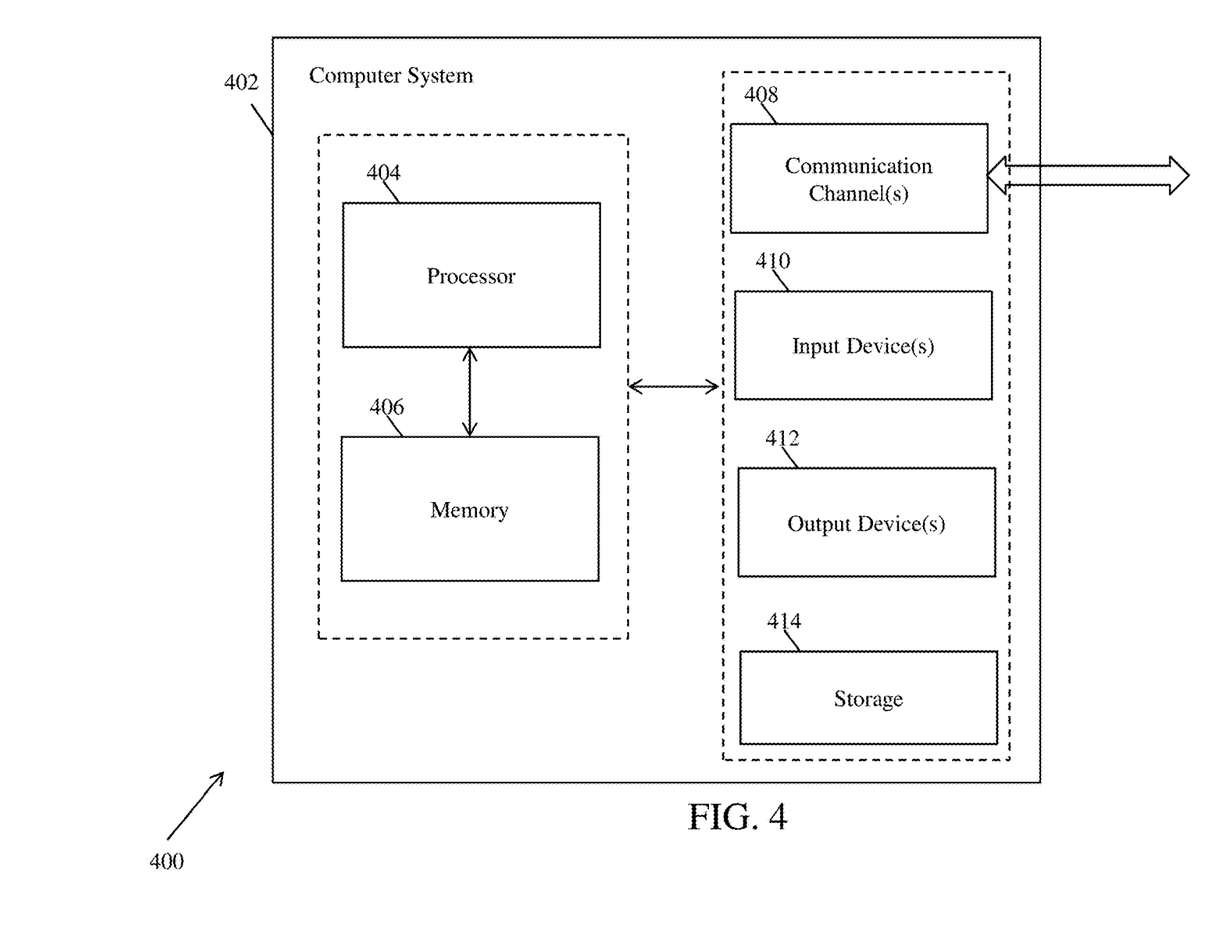
FIG. 4 illustrates an exemplary computer system for efficiently recognizing cursive handwritten characters in documents, in accordance with an embodiment of the present invention.

FIG. 4 illustrates an exemplary computer system for defining clinical workflows and generating user interface screens, in accordance with an embodiment of the present invention.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for efficient recognition of one or more handwritten characters in one or more documents, the system comprising:
a memory storing instructions for recognition of one or more handwritten characters in one or more documents;
a processor executing instructions stored in the memory to:
receive the one or more documents as one or more images;
extract one or more fields of information from the one or more received images;
segment the one or more extracted fields of information into one or more segments;
extract one or more handwritten characters from each of the one or more segments; wherein extracting the one or more characters comprises:
dividing each of the one or more segments into one or more cells of pre-determined dimensions;
computing a histogram of oriented gradient descriptor for each of the one or more cells; and
normalizing the histogram of oriented gradient descriptor for each of the one or more cells and using principal component analysis to extract the one or more characters;
recognize the one or more extracted handwritten characters; and
detect and correct one or more errors in the one or more recognized characters, wherein detecting and correcting the one or more errors comprises:
analyzing content in the vicinity of each of the one or more recognized characters;
predicting one or more characters for each of the one or more recognized characters in the extracted fields of information based on the analyzed content;
comparing each of the one or more recognized characters with the one or more predicted characters to detect the one or more errors in the one or more recognized characters; and
implementing one or more pre-stored error correction rules and pre-stored error correction algorithms corresponding to the one or more detected errors.

2. The system of claim 1, wherein the one or more fields of information are areas within the one or more processed images containing the one or more handwritten characters.

3. The system of claim 1, wherein the one or more handwritten characters are in the form of: cursive handwritten characters and isolated handwritten characters.

4. The system of claim 1, wherein the one or more handwritten characters comprise: alphabets, numerals and special characters.

5. The system of claim 1, wherein the content in the vicinity of the one or more recognized characters comprise at least one of: one or more labels and other recognized characters.

6. The system of claim 1, wherein predicting the one or more characters for each of the one or more recognized characters comprises using pre-stored information corresponding to the analyzed content.

7. The system of claim 6, wherein the information corresponding to the analyzed content is pre-stored for each of the one or more documents and further wherein the pre-stored information comprises layout, one or more labels, coordinates of the one or more fields of information corresponding to each of the one or more labels, relationship between two or more fields of information and permissible data format and data type for each of the one or more fields of information of the one or more documents.

8. The system of claim 1, wherein the one or more detected errors comprise number substitution errors, alphabet case errors, incorrect data type errors and format errors.

9. The system of claim 1, wherein the one or more error correction algorithms comprise one or more look-up tables containing mapping of misrecognized characters and combinations of misrecognized characters with corresponding correct characters and combinations of correct characters.

10. A computer-implemented method for efficient recognition of one or more handwritten characters in one or more documents, via program instructions stored in a memory and executed by a processor, the computer-implemented method comprising:
receiving the one or more documents as one or more images;
extracting one or more fields of information from the one or more received images;
segmenting the one or more extracted fields of information into one or more segments;
extracting one or more handwritten characters from each of the one or more segments; wherein the step of extracting the one or more handwritten characters comprises:
dividing each of the one or more segments into one or more cells of pre-determined dimensions;
computing a histogram of oriented gradient descriptor for each of the one or more cells; and
normalizing the histogram of oriented gradient descriptor for each of the one or more cells and using Principal Component Analysis (PCA) to extract the one or more handwritten characters;
recognizing the one or more extracted handwritten characters; and
detecting and correcting one or more errors in the one or more recognized characters, wherein the step of detecting and correcting the one or more errors comprises:
analyzing content in the vicinity of each of the one or more recognized characters;
predicting one or more characters for each of the one or more recognized characters in the extracted fields of information based on the analyzed content;

comparing each of the one or more recognized characters with the one or more predicted characters to detect the one or more errors in the one or more recognized characters; and implementing at least one of: one or more pre-stored error correction rules and one or more pre-stored error correction algorithms corresponding to the one or more detected errors.

11. The computer-implemented method of claim 10, wherein the one or more fields of information are areas within the one or more processed images containing the one or more handwritten characters.

12. The computer-implemented method of claim 10, wherein the one or more handwritten characters are in the form of: cursive handwritten characters and isolated handwritten characters.

13. The computer-implemented method of claim 10, wherein the one or more handwritten characters comprise: alphabets, numerals and special characters.

14. The computer-implemented method of claim 10, wherein the content in the vicinity of the one or more recognized characters comprises at least one of: one or more labels and other recognized characters.

15. The computer-implemented method of claim 10, wherein the step of predicting the one or more characters for each of the one or more recognized characters comprises using pre-stored information corresponding to the analyzed content.

16. The computer-implemented method of claim 15, wherein the information corresponding to the analyzed content is pre-stored for each of the one or more documents and further wherein the pre-stored information comprises layout, one or more labels, coordinates of the one or more fields of information corresponding to each of the one or more labels, relationship between two or more fields of information and permissible data format and data type for each of the one or more fields of information of the one or more documents.

17. The computer-implemented method of claim 10, wherein the one or more detected errors comprise number substitution errors, alphabet case errors, incorrect data type errors and format errors.

18. The computer-implemented method of claim 10, wherein the one or more error correction algorithms comprise one or more look-up tables containing mapping of misrecognized characters and combinations of misrecognized characters with corresponding correct characters and combinations of correct characters.

19. A computer program product for efficient recognition of one or more handwritten characters in one or more documents, the computer program product comprising:

a non-transitory computer-readable medium having computer-readable program code stored thereon, the computer-readable program code comprising instructions that when executed by a processor, cause the processor to:

receive the one or more documents as one or more images;

extract one or more fields of information from the one or more received images;

segment the one or more extracted fields of information into one or more segments;

extract one or more handwritten characters from each of the one or more segments; wherein extracting the one or more characters comprises:

dividing each of the one or more segments into one or more cells of predetermined dimensions:

computing a histogram of oriented gradient descriptor for each of the one or more cells: and normalizing the histogram of oriented gradient descriptor for each of the one or more cells and using principal component analysis to extract the one or more characters;

recognize the one or more extracted handwritten characters; and detect and correct one or more errors in the one or more recognized characters, wherein the step of detecting and correcting the one or more errors comprises:

analyzing content in the vicinity of each of the one or more recognized characters;

predicting one or more characters for each of the one or more recognized characters in the extracted fields of information based on the analyzed content;

comparing each of the one or more recognized characters with the one or more predicted characters to detect the one or more errors in the one or more recognized characters; and implementing at least one of: one or more pre-stored error correction rules and one or more pre-stored error correction algorithms corresponding to the one or more detected errors.

* * * * *